United States Patent
Speece et al.

(10) Patent No.: US 6,699,147 B1
(45) Date of Patent: Mar. 2, 2004

(54) MOWER WITH DUAL MECHANICAL TRANSMISSIONS

(75) Inventors: Kenneth B. Speece, Wooster, OH (US); Mark Kluck, Strongsville, OH (US); Hartmut Kaesgen, Berea, OH (US)

(73) Assignee: MTD Products Inc, Valley City, OH (US)

(*) Notice: Subject to any disclaimer, the term of this patent is extended or adjusted under 35 U.S.C. 154(b) by 96 days.

(21) Appl. No.: 09/711,490

(22) Filed: Nov. 10, 2000

Related U.S. Application Data
(60) Provisional application No. 60/164,712, filed on Nov. 11, 1999.

(51) Int. Cl.[7] .............. F16H 7/00; F16H 7/12; A01D 69/06; B60K 17/00
(52) U.S. Cl. .......... 474/87; 474/133; 474/148; 56/11.1; 180/337; 180/374
(58) Field of Search .............. 474/27, 133, 29, 474/135, 84, 138, 211, 148, 85–89; 56/11.1, 11.3, 11.4, 11.8, 16.9, 13.7, 10.2–10.9; 180/337, 344, 167, 308

(56) References Cited

U.S. PATENT DOCUMENTS

| | | |
|---|---|---|
| 3,743,043 A | 7/1973 | Gelinas |
| 3,999,444 A | 12/1976 | Willman |
| 4,117,652 A | 10/1978 | Jones et al. .................. 56/11.8 |
| 4,322,934 A | 4/1982 | Doi .............................. 56/11.1 |
| 4,558,558 A | 12/1985 | Horner, Jr. et al. ........... 56/11.3 |
| 4,768,997 A * | 9/1988 | Page et al. ..................... 474/27 |
| 4,809,796 A * | 3/1989 | Yamaoka et al. ........... 180/308 |
| 4,887,415 A * | 12/1989 | Martin ..................... 56/10.2 R |
| 4,934,989 A | 6/1990 | Furukawa et al. .......... 474/135 |
| 4,964,265 A * | 10/1990 | Young ........................ 56/10.8 |
| 5,042,238 A | 8/1991 | White, III et al. ........... 56/11.8 |
| 5,077,959 A | 1/1992 | Wenzel ........................ 56/11.1 |
| 5,127,215 A | 7/1992 | Wenzel ........................ 56/11.1 |
| RE34,057 E | 9/1992 | Middlesworth |
| 5,247,784 A | 9/1993 | Kitamura et al. ............ 56/10.8 |
| 5,297,379 A | 3/1994 | Smith ........................... 56/11.8 |
| 5,337,543 A | 8/1994 | Kitamura et al. ............ 56/10.8 |
| 5,355,661 A | 10/1994 | Tomiyama ................... 56/10.8 |
| 5,517,809 A | 5/1996 | Rich .............................. 56/2 |
| 5,816,034 A | 10/1998 | Peter ........................... 56/11.4 |
| 5,894,907 A * | 4/1999 | Peter ............................ 56/229 |
| 6,155,033 A * | 12/2000 | Wians et al. ................. 56/11.1 |

FOREIGN PATENT DOCUMENTS

| | | |
|---|---|---|
| DE | 1457922 | 4/1969 |
| DE | 1582393 | 7/1970 |

OTHER PUBLICATIONS

Non–certified translation of German Patent 1,457,922.

* cited by examiner

Primary Examiner—Marcus Charles
(74) Attorney, Agent, or Firm—Roger D. Emerson; Timothy D. Bennett; Brouse McDowell

(57) ABSTRACT

A vegetation mower incorporating a drive train using two mechanical transmissions to selectively drive the ground engaging wheels at different speeds. The drive train incorporates a single pulley belt to transfer power from the mower engine to the drive wheels.

11 Claims, 5 Drawing Sheets

MOWER WITH DUAL MECHANICAL TRANSMISSIONS

CROSS REFERENCE TO RELATED APPLICATION

This application claims priority from U.S. Provisional Patent Application Serial No. 60/164,712, filed Nov. 11, 1999.

FIELD OF INVENTION

The present invention relates to the drive train of a vegetation mower, and in particular to the drive train of a mower utilizing a single pulley belt in conjunction with dual mechanical transmissions.

BACKGROUND OF THE INVENTION

A major component of vegetation mowers is the drive train, which transfers power from the engine to the ground engaging wheels. A typical drive train includes a single transmission. In more recent times, with the advent of using drive wheels to steer the mower, two transmissions operatively connected one to each of the drive wheels of the mower is common. Each transmission is separately controlled so that the drive wheels may be driven at different speeds. One transmission may selectively be disengaged allowing that corresponding wheel to stop rotating in order to limit damage to the turf during tight turns. In either case, driving the wheels at different speeds effectively steers the vehicle.

One method of driving the wheels of a mower at different speeds is disclosed in U.S. Pat. No. RE 34,057. This patent discloses a vehicle having two hydrostatic drive transmissions providing power input to a corresponding pair of left and right driving wheels. This patent further discloses a steering mechanism and an accelerator mechanism. The accelerator mechanism provides input to the two transmissions.

U.S. Pat. No. 5,816,034 also discloses a belt drive system for a grounds care device using two hydrostatic transmission power units. This patent allows for two identical hydrostatic transmission units to be incorporated due to an asymmetrical design of the drive train.

A second method of driving the wheels of a mower at different speeds is disclosed in U.S. Pat. No. 3,999,444. This patent discloses two transmissions having instant reversing capability and vehicle steerage capability. A plurality of pulley plates and pulley belts are used to provide input to each of the transmissions.

Although hydrostatic transmissions work well for their intended purpose, one disadvantage with them is their cost. While the hydrostatic drives provide precise control over the drive wheels, they also substantially increase the cost of manufacturing such a drive train. It is also often necessary to add to the hydrostatic drive, a gear reduction mechanism to provide the required rotational speed to the drive wheels. What is needed is a drive train that provides separate drive wheel control without the use of expensive hydrostatic transmissions.

A disadvantage with known mechanical transmissions, as described above, is that the drive train requires a plurality of pulleys and belts to provide input into the transmissions. The plurality of components increases manufacturing costs and maintenance costs, since the pulleys and belts are interconnected and must be adjusted over the course of normal usage. Additionally, replacement or repair costs are also increased; as there are increased components that are affected by wear.

It would therefore be advantageous to provide a drive train for use on a vegetation mower that would reduce the cost of manufacturing and maintaining the vegetation mower, while providing the capability of driving the wheels at different speeds. It would also be advantageous to provide a simplified drive train using cost effective mechanical transmissions and a single pulley belt.

SUMMARY OF THE INVENTION

It is therefore an object of the present invention to provide vegetation mower having dual mechanical transmissions driven by a single belt that drive the ground engaging wheels at different speeds.

It is also an object of the present invention to reduce the cost of manufacturing a vegetation mower that incorporates a dual transmission drive train.

It is still another object of the present invention to reduce the cost and complexity of maintenance for a vegetation mower that incorporates a dual transmission drive train.

It is yet another object of the present invention to provide dual mechanical transmissions with variable input pulleys.

According to the present invention, a vegetation mower is provided having dual mechanical transmissions operatively attached one to each of two ground engaging wheels. Each of the transmission drives have an input shaft whereon is mounted a driven pulley. Each of the driven pulleys is communicated to a driving pulley, which is operatively connected to an output of the engine via a single pulley belt. An idler pulley maintains operative tension of the pulley belt during normal operation. The outputs of the transmissions are connected one to each of the drive wheel axles. The transmissions are operated by selectively engaging a clutching means. In one embodiment, the driven pulleys are variable pulleys whereby the pulley belt engages a conical surface of the pulley at any point within an affective operating region of the conical surface. In this manner, input to the transmission may be selectively varied without affecting the input to the other transmission.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
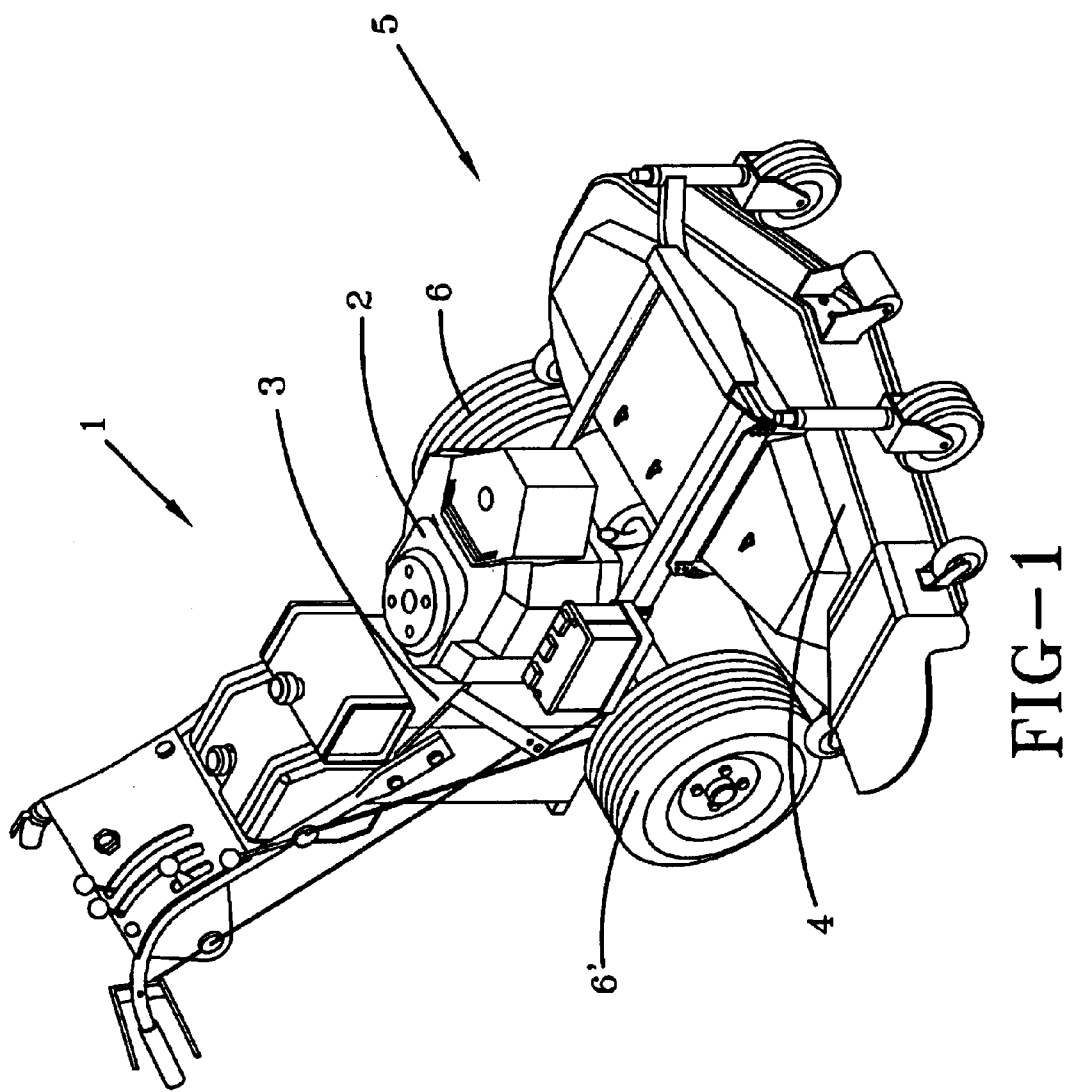
FIG. 1 is a perspective side view of a mower incorporating the present invention.

Referring now to the drawings wherein the showings are for purposes of illustrating a preferred embodiment of the invention only and not for purposes of limiting the same, FIG. 1 depicts walk-behind mower 1 having a frame 3, first and second ground engaging wheels 6, 6', an engine 2, and a mower deck 4. The present invention relates to the drive train of the mower 1 wherein power from the engine 2 is selectively transferred to the ground engaging wheels 6, 6' for use in driving the wheels 6, 6' at different rates of speed. It is expressly noted that the present invention is applicable to any type of vegetation mower including riding mowers or any type of power driven vehicle.

Figure 2:
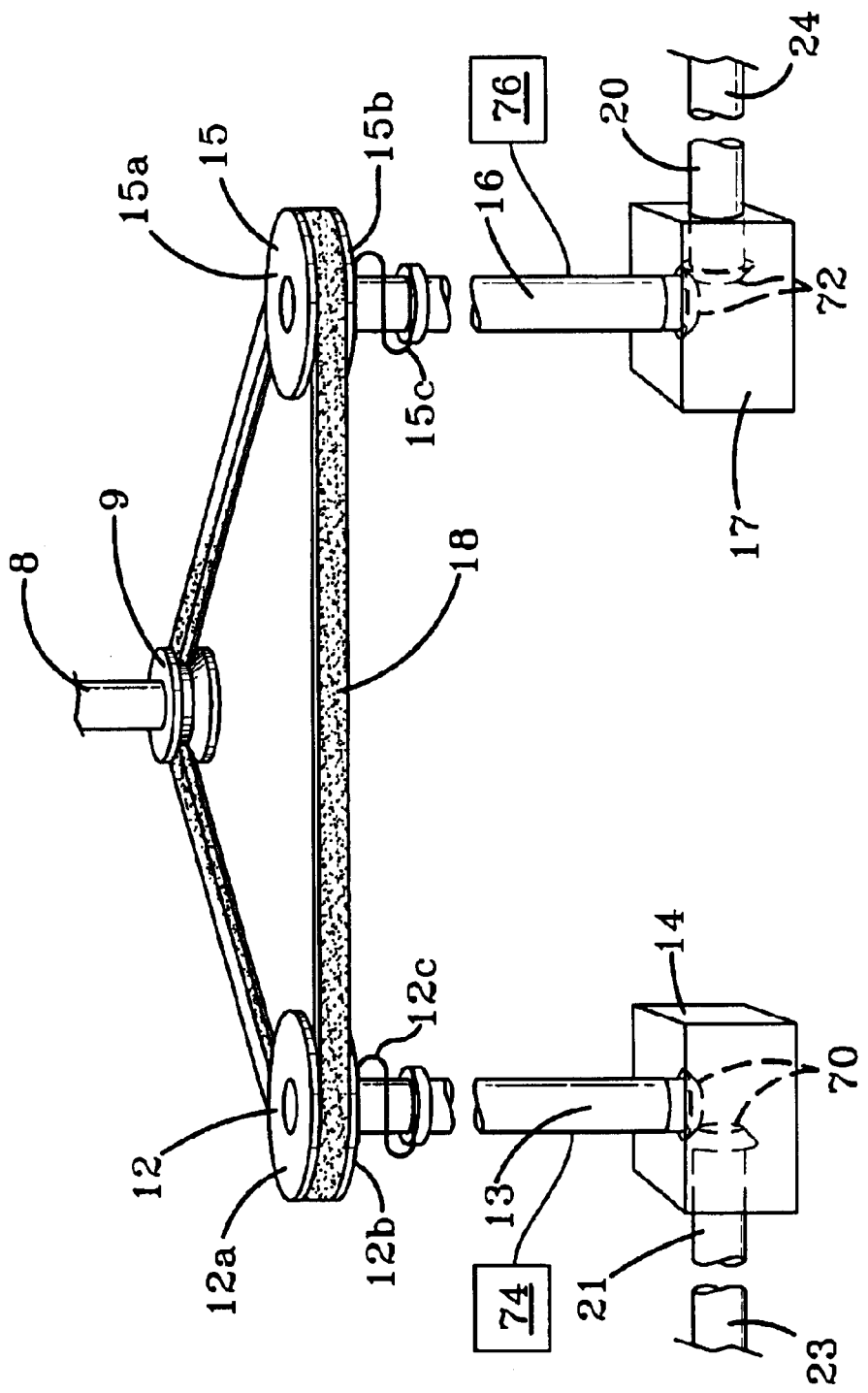
FIG. 2 is perspective view of the drive train showing the pulleys and belt assembly.
Figure 3:
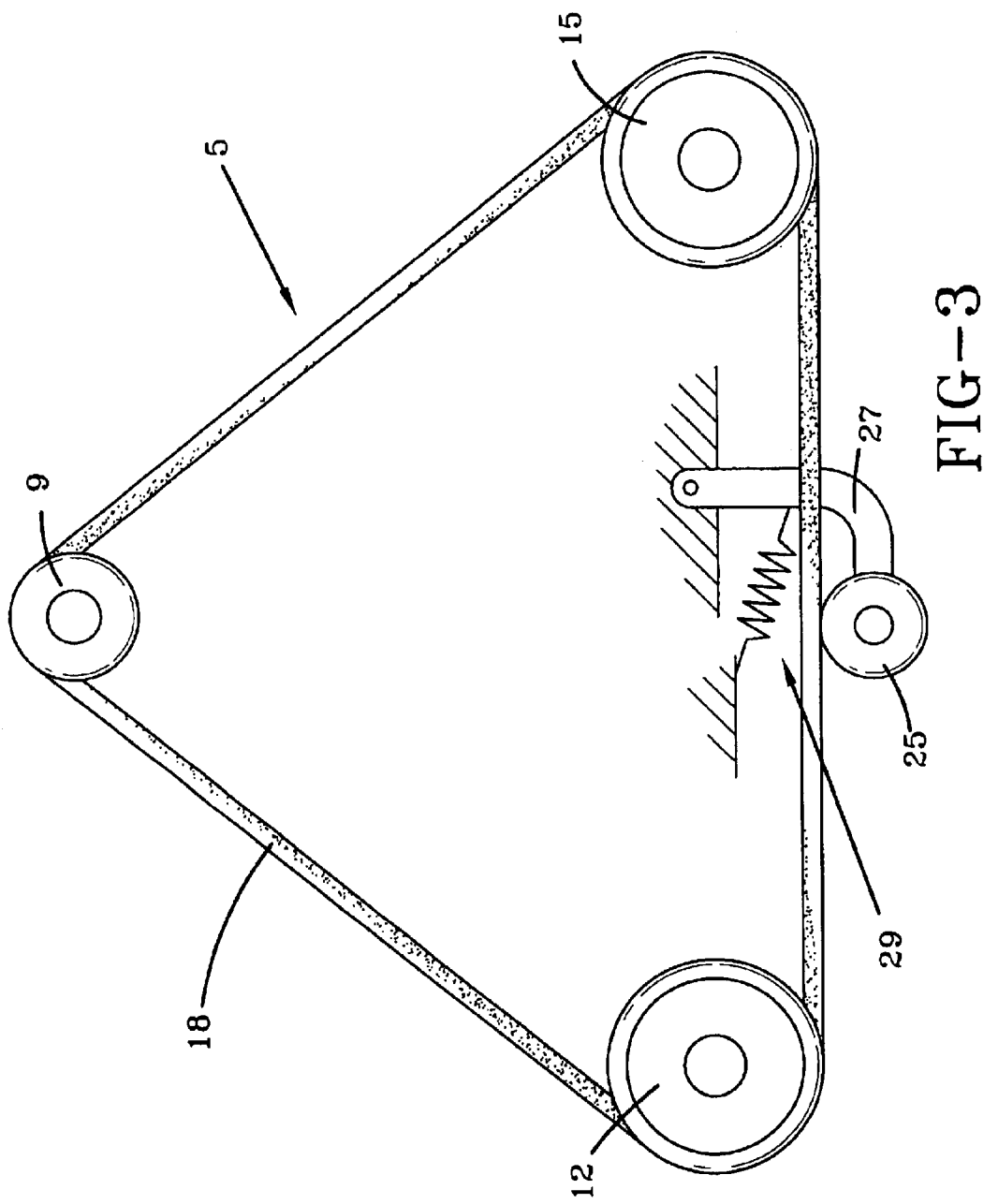
FIG. 3 is a top view of the mower drive train.

With reference to FIG. 2 and 3, the drive train 5 of the preferred embodiment of the present invention is depicted showing an output shaft 8 extending from engine 2. A driving pulley 9 is operatively attached to output shaft 8 such that rotational power is transferred thereto. First and second driven pulleys 12, 15 are also shown operatively connected to first and second mechanical transmissions 14, 17 via pulley shafts 13, 16 respectively. A single pulley belt 18 communicates power from the driving pulley 9 to the driven pulleys 12, 15. In the preferred embodiment as illustrated in FIG. 3, an idler pulley 25 maintains operative tension on the pulley belt 18 during normal use, via spring 29 and pivoting arm 27.

Figure 4A:
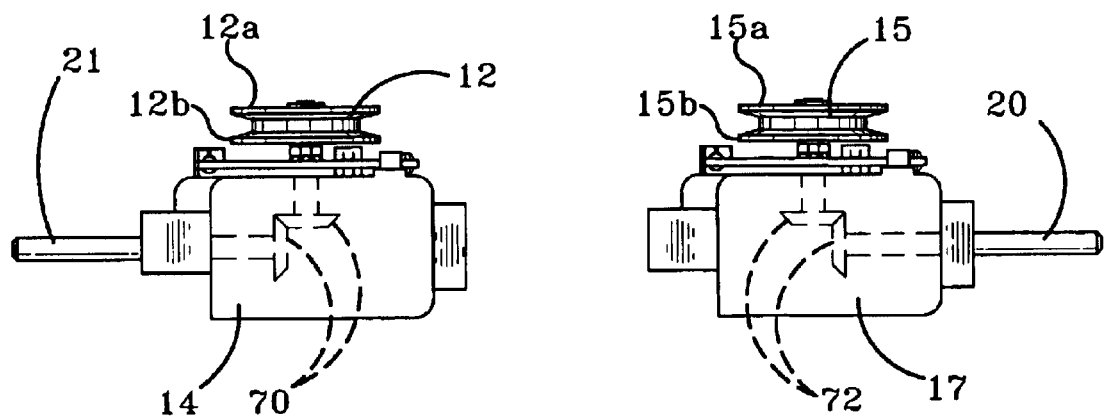
FIG. 4a is a side perspective view of the mechanical transmissions shown in FIG. 4.
Figure 4:
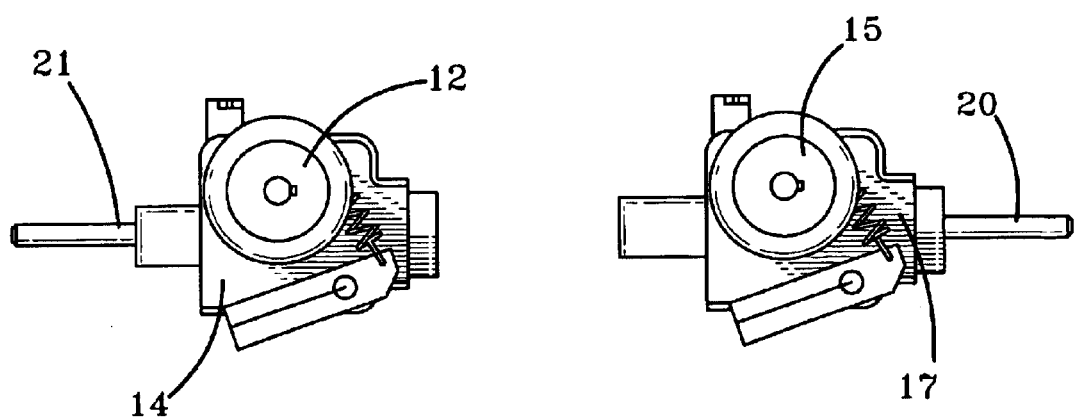
FIG. 4 is top perspective view of the mechanical transmissions.

With reference now to FIGS. 4 and 4a, first and second mechanical transmissions are shown at 14 and 17. By mechanical transmission it is meant: a device that transfers motive force by a means not utilizing fluid power, electric power or any combination thereof. One such embodiment includes a first plurality of gears 70 and a second plurality of gears 72 internally mounted within a housing that receives an input through an input shaft and transmits a rotational power output through an output shaft. However, it is expressly noted that any such means for transmitting motive forces may be chosen with sound engineering judgment that does not incorporate fluid power or electrical power, such as is readily and commercially available. The first and second transmissions 14, 17 may also include a first and second clutching mechanism 74, 76, respectively or clutch. The clutch may be disposed internal or external to the transmissions 14, 17 as chosen with sound engineering judgment. The clutch is operatively communicated such that the user has selective control over engagement or disengagement of the clutch. In that such clutches are well known in the art, no further explanation will be offered at this point.

Figure 5:
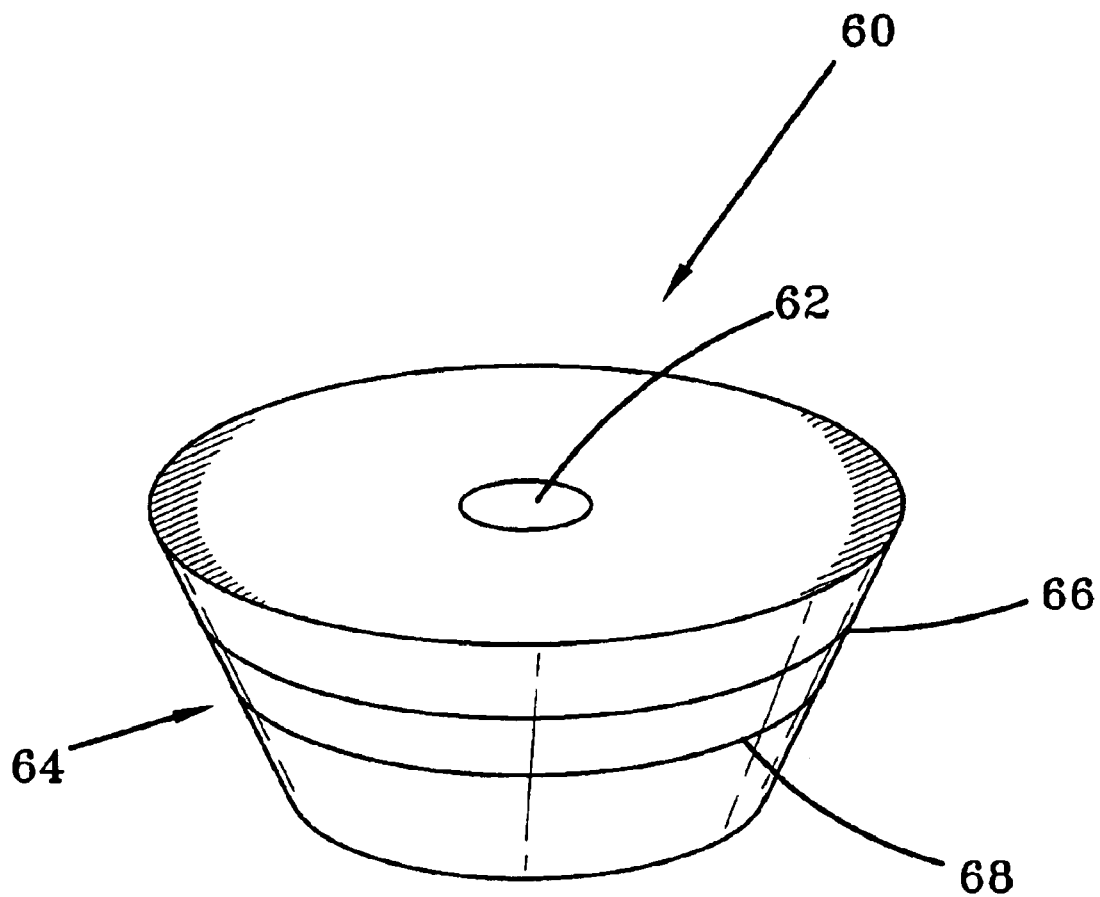
FIG. 5 is perspective view of a variable pulley.

With reference to FIG. 5, in one embodiment, each of driven pulleys 12, 15 may be a variable pulley 60. Pulley 60 has a hole 62 suitable for receiving pulley shaft 13, 16. The pulley 60 further has a slanted, conically shaped surface 64 so that a belt 18 riding on the pulley 60 at a location designated by line 66 would have a different speed than the belt riding on pulley 60 at location 68. Any means of adjusting the location of the belt 18 along the conical surface 64 of the pulley 60 may be chosen with sound engineering judgment.

With reference to FIGS. 2, 4 and 4a, in an alternate embodiment, each of the driven pulleys 12, 15 may be varied by controlling the space between the pulley halves thus varying the rotational speed of the pulley shafts 13, 16 respectively. This type of variable pulley can also be of any type chosen with sound engineering judgment.

In that such first pulley adjusting means 12a, 12b and second pulley adjusting means 15a, 15b are well known in the art, no further explanation will be offered here. An example of such adjusting means 12c, 15c is shown in FIG. 2. Any adjusting means chosen with sound engineering judgment may be utilized. In this manner, input into one of the transmissions may be varied in relation to and without affecting the input into the other transmission, facilitating selectively variable rotation of a first transmission input shaft with respect to said second input shaft.

Referring now to FIGS. 1 through 5, operation of the present invention will now be discussed. Rotational power from the engine 2 is translated to a driving pulley 9, which is subsequently communicated by the single pulley belt 18 to each of the two driven pulleys 12, 15. Pulleys 12, 15 rotate with respect to the transmissions 14, 17 providing power input thereto via input shafts 13, 16. Mechanical transmissions 14, 17 have respective output shafts 21, 20 to which are operatively connected to drive wheels 6, 6'. In one embodiment drive wheel axles 23, 24 are directly and rigidly coupled to output shafts 21, 20 respectively. Operation of the drive wheels is selectively actuated by engaging transmissions 14, 17 via a clutch or by varying the position of the belt at the driven pulleys 12, 15. The pulley speed variation can be made by adjusting the belt 18 along the conical surface of the variable pulley 60 or, alternatively, by adjusting the space between the pulley halves.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A mower, comprising:
   a frame;
   a mower deck operatively attached to said frame;
   an engine operatively attached to said frame, said engine including a first power output shaft;
   at least first and second ground engaging wheels for use in providing mobility to said mower; and,
   a drive train for use in transferring power from said engine to said first and second ground engaging wheels, wherein said drive train may selectively drive said first and second ground engaging wheels at different speeds, said drive train comprising:
   a driving pulley operatively connected to said first power output shaft;
   a first driven pulley;
   a first non-fluid powered, single pulley mechanical transmission, wherein said first driven pulley is rotatably attached with respect to said first mechanical transmission, and wherein said first ground engaging wheel is operatively connected to said first mechanical transmission;
   a second driven pulley;
   a second non-fluid powered, single pulley mechanical transmission, wherein said second driven pulley is rotatably attached with respect to said second mechanical transmission, and wherein said second ground engaging wheel is operatively connected to said second mechanical transmission; and,
   a single pulley belt operatively engaging each of said driving pulley and first and second driven pulleys.

2. The mower of claim 1, further comprising:
   an idler pulley operatively engaging said pulley belt.

3. The mower of claim 2, wherein said first mechanical transmission includes a first clutching means, and wherein said second mechanical transmission includes a second clutching means.

4. The mower of claim 3, wherein said first mechanical transmission includes a first plurality of gears, and wherein said second mechanical transmission includes a second plurality of gears.

5. The mower of claim 4, wherein said first mechanical transmission includes a first input shaft, and wherein said first driven pulley is fixedly received by said first input shaft; and, wherein said second mechanical transmission includes a second input shaft, and wherein said second driven pulley is fixedly received by said second input shaft.

6. The mower of claim 5, wherein rotation of said first input shaft is selectively variable with respect to rotation of said second input shaft.

7. The mower of claim 6, wherein each of said first and second driven pulleys is a variable pulley, and further comprising:

first and second pulley adjusting means operatively connected to said first and second driven pulleys respectively.

8. A drive train for use in transferring power from an associated engine having a first power output shaft to at least first and second associated ground engaging wheels having first and second axles respectively, wherein said drive train may drive said first and second associated ground engaging wheels at different speeds, said drive train comprising:

a driving pulley operatively connected to said first power output shaft;

a first driven pulley;

a first non-hydraulic, single pulley mechanical transmission, wherein said first driven pulley is rotatably attached with respect to said first mechanical transmission, and wherein said first axle is operatively connected to said first mechanical transmission, wherein said first non-hydraulic, single pulley mechanical transmission includes a first input shaft, and wherein said first driven pulley is fixedly received by said first input shaft;

a second driven pulley, wherein each of said first and second driven pulleys is a variable pulley and further comprises first and second variable pulley adjusting means operatively connected to each said first and second driven pulleys respectively;

a second non-hydraulic, single pulley mechanical transmission, wherein said second driven pulley is rotatably attached with respect to said second mechanical transmission, and wherein said second axle is operatively connected to said second mechanical transmission, wherein said second non-hydraulic, single pulley mechanical transmission includes a second input shaft, and wherein said second driven pulley is fixedly received by said second input shaft, wherein rotation of said first input shaft is selectively variable with respect to rotation of said second input shaft; and, a single pulley belt operatively engaging each of said driving pulley and first and second driven pulleys.

9. The drive train of claim 8, wherein said first mechanical transmission includes a first plurality of gears, and wherein said second mechanical transmission includes a second plurality of gears.

10. The drive train of claim 9, wherein said first mechanical transmission includes a first clutching means, and wherein said second mechanical transmission includes a second clutching means.

11. The drive train of claim 10, further comprising:

an idler pulley operatively engaging said pulley belt.

* * * * *